(12) United States Patent  
Choi

(10) Patent No.: US 7,208,702 B2
(45) Date of Patent: Apr. 24, 2007

(54) STEAM COOKER

(75) Inventor: Lung Wai Choi, Sai Kung (CN)

(73) Assignee: Goodway Electrical Co., Ltd., Kowloon (HK)

( * ) Notice: Subject to any disclaimer, the term of this patent is extended or adjusted under 35 U.S.C. 154(b) by 0 days.

(21) Appl. No.: 11/126,748

(22) Filed: May 11, 2005

(65) Prior Publication Data

US 2006/0108348 A1 May 25, 2006

Related U.S. Application Data

(60) Provisional application No. 60/629,334, filed on Nov. 22, 2004.

(51) Int. Cl.
*A47J 27/04* (2006.01)

(52) U.S. Cl. ............. 219/401; 219/430; 219/433; 126/369; 99/410

(58) Field of Classification Search ............. 219/401, 219/400; 126/369; 99/410, 446, 450
See application file for complete search history.

(56) References Cited

U.S. PATENT DOCUMENTS 5,172,627 A * 12/1992 Narcisi et al. ............. 99/330
5,400,701 A * 3/1995 Sham ...................... 99/410
5,404,803 A * 4/1995 Glucksman ............... 99/473
5,649,476 A   7/1997 Montagnino et al.
5,992,303 A   11/1999 Lee
6,230,612 B1  5/2001 Rossi
6,474,222 B1  11/2002 Pretre
6,655,264 B2  12/2003 Rossi
D488,951 S   4/2004 Josancy
D490,646 S   6/2004 Chedal Anglay
7,045,745 B2 * 5/2006 Kim ....................... 219/400
2003/0084790 A1 * 5/2003 Rossi ...................... 99/330
2004/0112372 A1 * 6/2004 Dumoux et al. ........... 126/369
2005/0127061 A1 * 6/2005 Ha ......................... 219/401

FOREIGN PATENT DOCUMENTS

JP  09-285389   11/1997
JP  11-267011   10/1999
JP  11-267013   10/1999

* cited by examiner

*Primary Examiner*—Joseph Pelham
(74) *Attorney, Agent, or Firm*—Faegre & Benson LLP

(57) ABSTRACT

A steam cooker includes a first reservoir for receiving water, a second reservoir for receiving water, and a heating element. The water in the second reservoir is in fluid communication with the water in the first reservoir. The heating element is positioned proximate to the first reservoir and remote to the second reservoir.

12 Claims, 10 Drawing Sheets

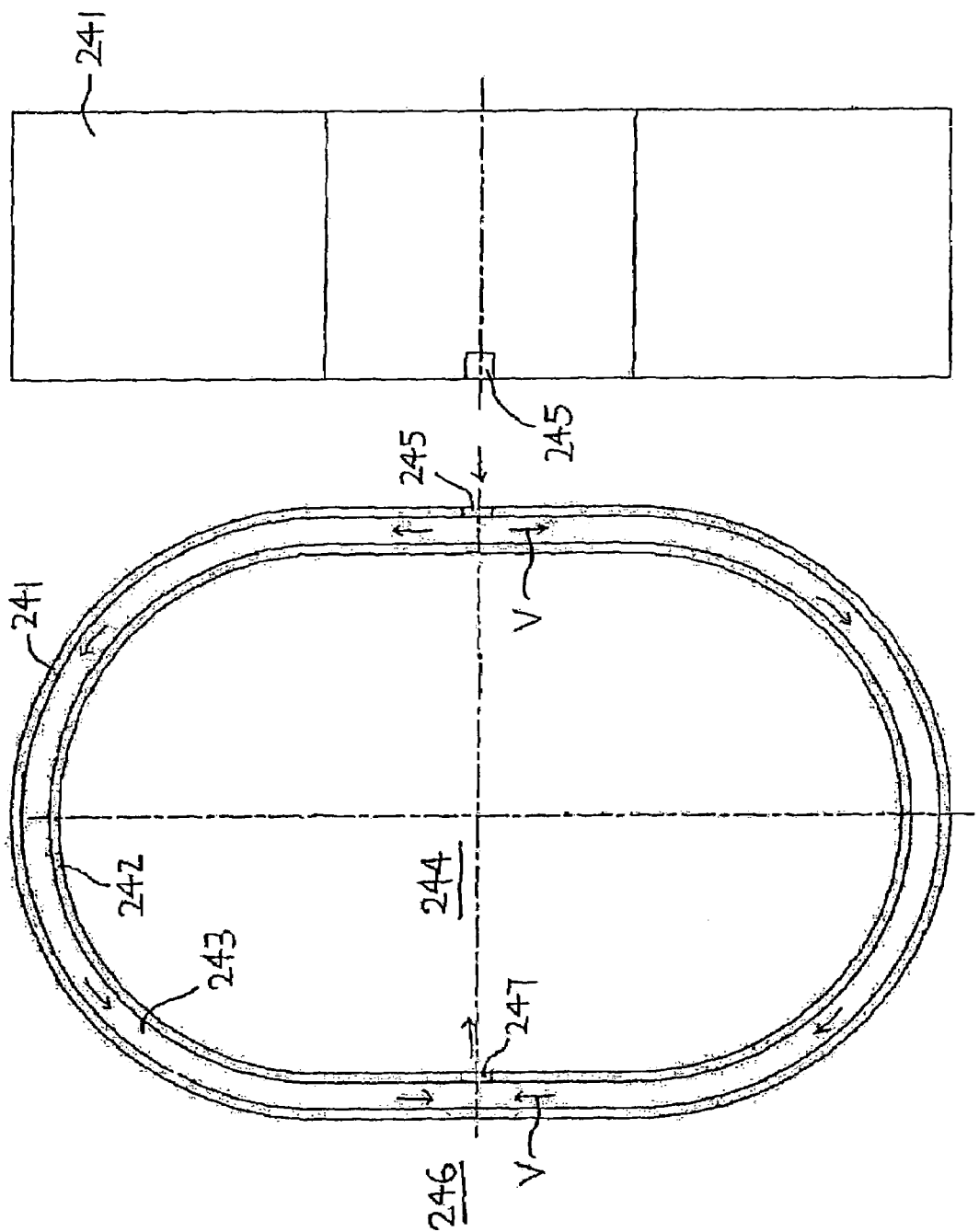

STEAM COOKER

CROSS REFERENCE TO RELATED APPLICATION

This application claims the benefit of U.S. Provisional Application Ser. No. 60/629,334 filed Nov. 22, 2004, which is hereby incorporated by reference in its entirety.

FIELD OF THE INVENTION

The present invention relates to a kitchen appliance. In particular, the present invention relates to a steam cooker.

BACKGROUND OF THE INVENTION

Steam cookers are used in the preparation of food by heating water in a container to produce steam for cooking. Conventional steam cookers available on the market for home use generally employ relatively high wattage electric heaters mounted in the bottom of a container to generate steam for cooking. The heaters employed in known steam cookers of this type generally have not been entirely satisfactory for various reasons.

Heating units which employ a larger heating surface in contact with the water in the container are also known. Such units generally employ a large metal heat sink and heat the entire volume of water to the boiling point before steam cooking can commence. Attempts to reduce this startup time by using heater elements of higher capacity generally result in a higher overshoot temperature which may result in more violent localized boiling action and can result in a shortened life for the heating element.

The conventional steam cookers take about 7 minutes to heat up water from ambient temperature to a boiling point. Therefore, it remains desirable to produce an improved steam cooker that can speed up the time required to heat the water to a boiling point.

BRIEF SUMMARY OF THE INVENTION

The present invention is directed to a steam cooker. According to one embodiment of the present invention, the steam cooker includes a first reservoir for receiving water, a second reservoir for receiving water, and a heating element. The water in the second reservoir is in fluid communication with the water in the first reservoir. As used in the present invention, the term "fluid communication" refers to the flow of liquid between the first reservoir and the second reservoir. The heating element is positioned proximate to the first reservoir and remote to the second reservoir. The heating element is configured to be capable of heating the water in the first reservoir to a boiling point while incapable of heating the water in the second reservoir to a boiling point. The heating element can be configured to consume electricity or gas.

According to another embodiment of the present invention, a steam cooker includes a heating element, a container, and at least one barrier. The barrier is disposed in the container to divide the container into a first compartment for receiving water and a second compartment for receiving water. The water in the first compartment and the water in the second compartment are in fluid communication with each other. The heating element is disposed proximate to the first compartment while remote to the second compartment. The heating element is configured to be capable of heating the water in the first compartment to a boiling point while incapable of heating the water in the second compartment to a boiling point. The heating element can be configured to consume electricity or gas.

The first compartment may be at the center area of the container, while the second compartment may be at the peripheral area of the container. The at least one barrier of the steam cooker may define at least one water passage between the first and second compartments. The barrier may include a wall extending upwardly from the bottom of the container. The barrier may extend substantially around the heating element.

In one embodiment, the barrier may extend spirally inwardly from a sidewall of the container. In another embodiment, the barrier may be in a shape of "6" or "9" or a mirror image of number "6" or "9". In yet another embodiment, the barrier may be in a shape of coil which defines a coil-shaped water passage between the first compartment and the second compartment of the container.

In yet another embodiment, a loop-shaped inner barrier and a loop-shaped outer barrier are provided. The loop-shaped inner barrier defines the first compartment of the container. The loop-shaped outer barrier and the sidewall of the container define the second compartment of the container. The loop-shaped inner barrier and loop-shaped outer barrier also define therein a loop-shaped water passage. The loop-shaped inner barrier includes a first opening, while the loop-shaped outer barrier includes a second opening. Optionally, the first opening is opposite to the second opening.

The steam cooker may further include a drip tray having an opening corresponding to the first compartment of the container in shape and size for directing the steam to move upwardly.

The present invention also provides a method of steam cooking. The method includes heating water in a first reservoir which is in fluid communication with water a second reservoir. Both the first and second reservoirs are disposed within a cooking apparatus. Particularly, heating water in a first reservoir is achieved through using a heating element positioned proximate to the first reservoir and remote to the second reservoir, so that the water in the first reservoir is capable of being heated to a boiling point while the water in the second reservoir is incapable of being heated to a boiling point. At least a barrier may be provided to divide the first reservoir and the second reservoir and define at least a water passage.

The steam cooker in accordance with the present invention provides advantages over the conventional one. Particularly, the heat up time, i.e. the time for heating up the water from the ambient temperature to the boiling point, of the steam cooker of the present invention is about 2 minutes and 30 seconds, as compared to at least 7 minutes for conventional steam cookers.

BRIEF DESCRIPTION OF THE DRAWINGS

FIG. 8 is a top plan view of the barrier of the container of FIG. 7;

FIG. 9 is a side view of the barrier of FIG. 8.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 2:
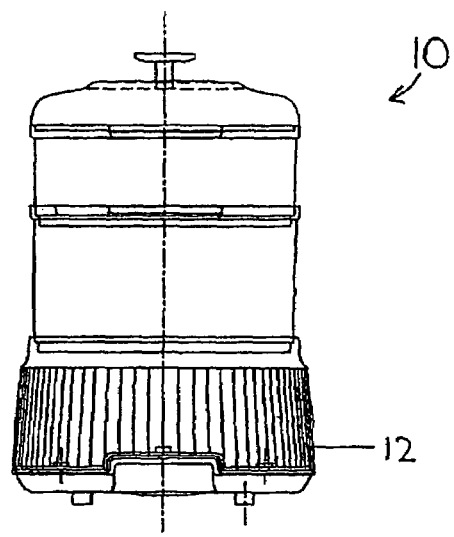
FIG. 2 is a side view of the steam cooker of FIG. 1.
Figure 1:
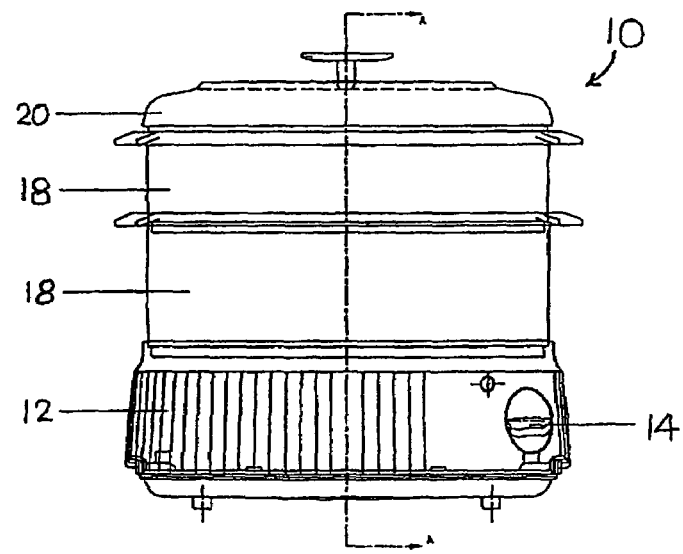
FIG. 1 is a front view of a steam cooker in accordance with an embodiment of the present invention.

Referring now to the drawings, in which like reference numerals represent like parts throughout the drawings, FIGS. 1 and 2 are the front and side views, respectively, of a steam cooker 10 in accordance with an embodiment of the present invention. The steam cooker 10 may include a base 12, one or more steaming bowls 18 provided on top of the base 12, and a cover 20 for covering the top steaming bowl 18. Optionally, the steam cooker 10 may also includes a timer knob 14 provided on the base 12.

Figure 3:
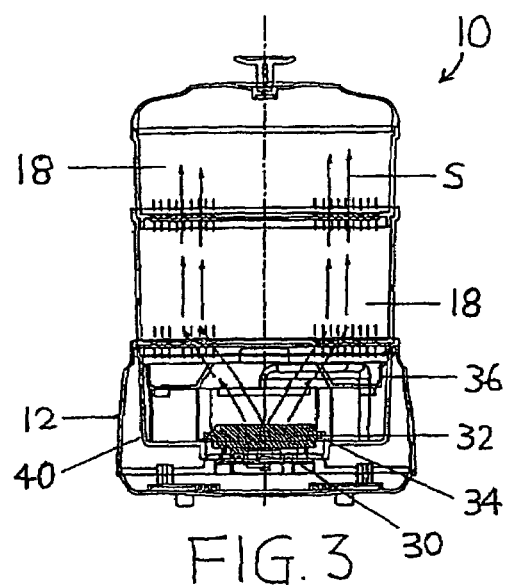
FIG. 3 is a cross sectional view of the steam cooker of FIG. 1 taken along line A—A.

FIG. 3 is a cross sectional view of the steam cooker 10 of FIG. 1 taken along line A—A. In the illustrated embodiment, a heater 30 powered by electricity or gas can be located in the base 12 generally at a central bottom portion thereof. A heating element 32 can be coupled to and disposed above the heater 30. The heating element 32 is adapted to be heated up by the heater 30. A container 40 is disposed within the base 12 of the steam cooker 10. Optionally, a sealing ring 34 may be used to sealingly engage the heating element 32 within an opening at the base of the container 40.

Optionally, a drip tray 36 may be provided at an upper portion of the base 12. The drip tray 36 is used to collect drips from the steam bowls 18. The collected drips can flow back to the container 40 through an opening provided on the drip tray 36. The drip tray 36 may be supported within the base 12 by a plurality of supporting lugs 38 on the upper surface of the bottom wall of the container 40 adjacent to the sidewall thereof. Embodiments of the drip tray will be discussed in FIGS. 12–15.

To commence cooking, food is placed in the steaming bowls 18. The water in the container 40 is heated up by the heating element 32 thereby producing steam in generally upward directions as depicted by arrows S in FIG. 3.

Figure 4:
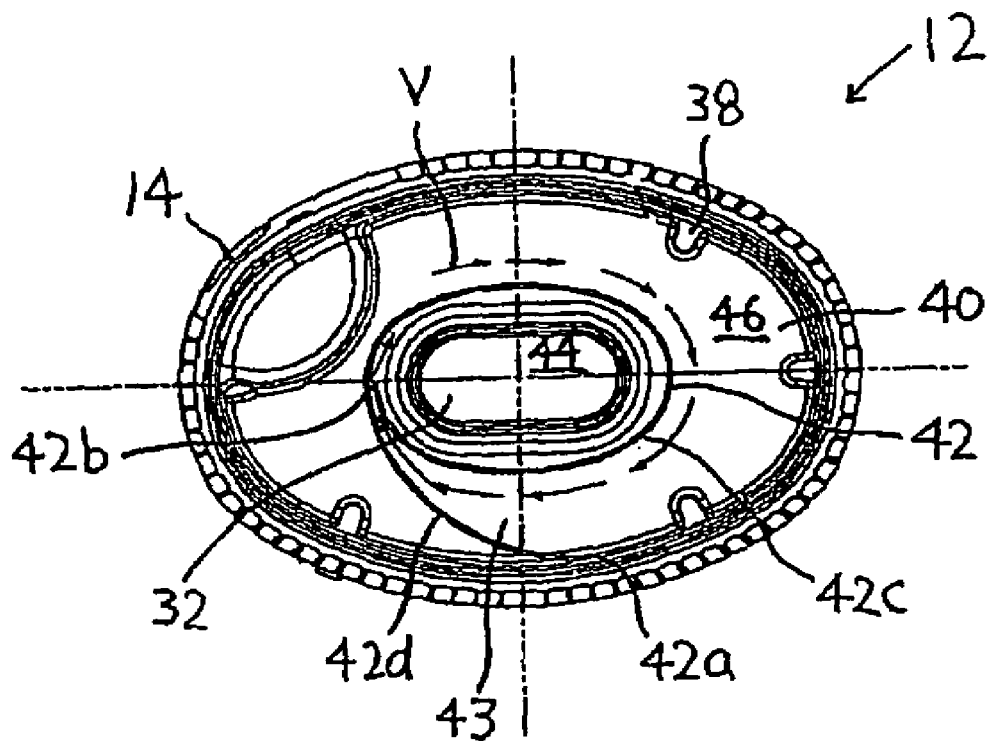
FIG. 4 is a top plan view of the base of the steam cooker showing a first embodiment of a container according to an embodiment of the present invention.
Figure 5:
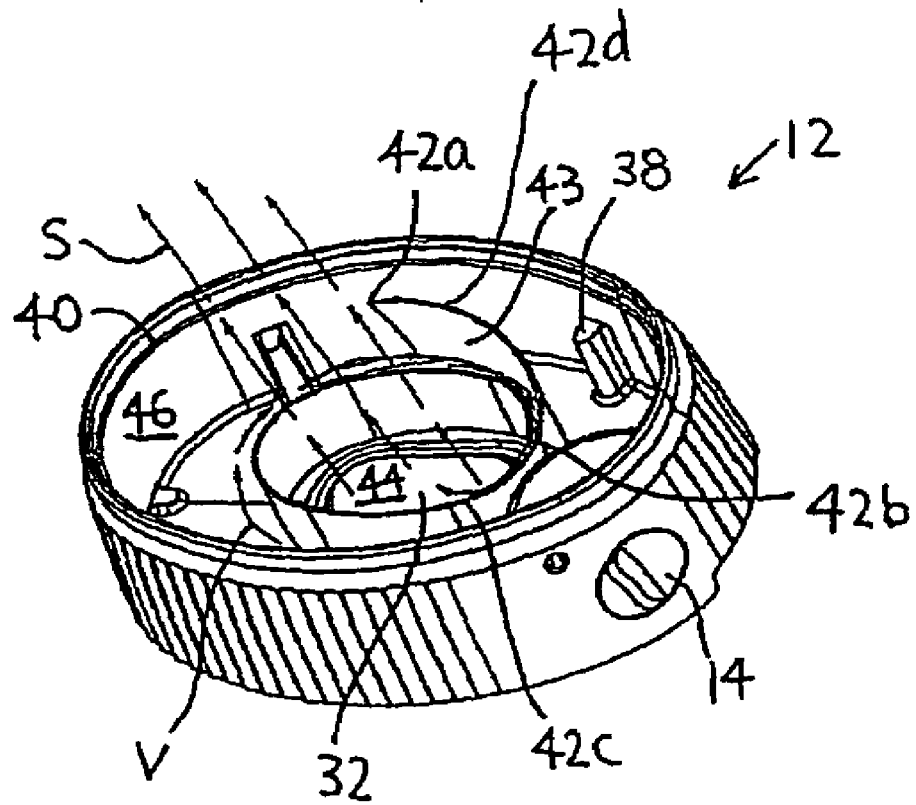
FIG. 5 is a perspective view of the base of the steam cooker of FIG. 4.

FIGS. 4 and 5 are the top plan view and perspective view, respectively, of the base 12 in accordance with an embodiment of the present invention.

The container 40 is located within the base 12 of the steam cooker 10. In the illustrated embodiment, a barrier 42, in the form of a wall, is provided on the base of the container 40. The barrier 42 may be formed integrally with the container 40. The barrier 42 generally divides the container 40 into a first compartment 44 and a second compartment 46 which are in fluid communication with each other.

In the illustrated embodiment, the first reservoir can be the first compartment 44 of the container 40, while the second reservoir can be the second compartment 46 of the container 40. The first compartment 44 can be the inner or central compartment of the container 40, while the second compartment 46 can be the outer or peripheral compartment of the container.

In the illustrated embodiment, the barrier 42 has an outer end 42a and an inner end 42b and is generally in the shape of the number "6" or "9" or the mirror image of the number "6" or "9", except that the inner end 42b is not touching the inner portion of the barrier 42. Preferably, the shape and size of first or central compartment 44 generally corresponds to those of the heating element 32 of the steam cooker 10, and the first or central compartment 44 is directly above the heating element 32, so that only the water in the first or central compartment 44 is directly heated by the heater. The barrier 42 may extend substantially vertically from the upper surface of the bottom wall of the container 40. The height of the barrier 42 may be less than the height of the sidewall of the container 40 so as to provide a space for the drip tray 36 which is adapted to be positioned top of the container 40.

In the illustrated embodiment, the outer end 42a may be abutted against or disposed adjacent to the sidewall of the container 40. The barrier 42 may extend from the outer end 42a spiraling inwardly towards the inner end 42b. The inner end 42b is not touching the inner surface of the barrier 42 thereby defining a narrowing horn-shaped channel or passage 43 for bringing the water in the container 40 as depicted by arrows V in FIGS. 4 and 5.

When water is poured into the container 40, the water fills up both the central and peripheral compartments 44, 46 of the container 40. The heating element 32 heats up the water in the central compartment 44 of the container 40 and steam so produced by such heating process rises up from the central compartment 44 towards the steaming bowl 18 as depicted by the arrows S as shown in FIG. 5.

The opening of the drip tray 36 guides the steam towards the steaming bowls 18 thereby heating up the food more efficiently.

As steam goes up from the central compartment 44 of the container 40, water level within the central compartment 44 drops. As the water level within the central compartment 44 gradually drops, water from the peripheral compartment 46 gradually flows inwardly, as depicted by arrows V, through the passage 43, and into the central compartment 46.

During the cooking process using the steam cooker 10 of the present invention, the fluid communication between the central and peripheral compartments 44, 46 of the container 40 is controlled by the barrier 42 so that the water within the peripheral compartment 46 remains at a relatively lower temperature as compared to the temperature of the water within the central compartment 44. The heating method of the present invention does not necessarily to heat up all the water within the container 40. Furthermore, the heating method avoids heating up of the water in the peripheral compartment 46 and in turn the sidewall of the base 12 which may waste energy and may burn the user.

For a conventional steam cooker, it is necessary to heat up substantially all the water in the entire container to produce steam. With the steam cooker of the present invention, it is required to heat up only the water in the central compartment 44 of the container 40 to produce steam ready for cooking. Due to the relatively small volume of water in the central compartment 44, the water will be heated up to a boiling point and produce steam much faster than conventional steam cooker.

Although it has been described that the barrier 42 is generally in the shape of the number "6" or "9" or the mirror image of the number "6" or "9", it is understood that the barrier 42 can be generally in spiral shaped, coil shaped, inwardly curving, or any other shape that can bring the water into the inner container.

Figure 6:
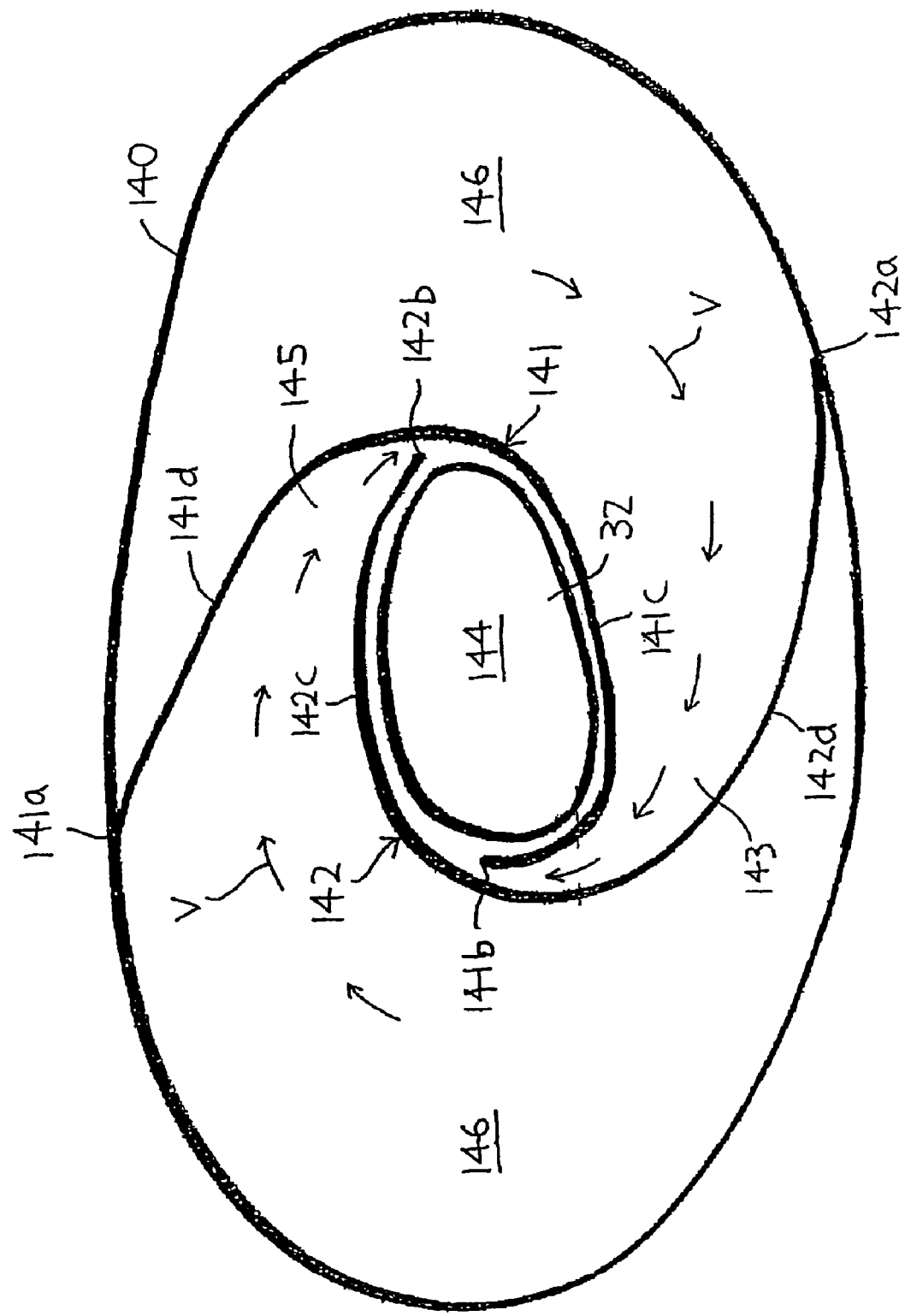
FIG. 6 is a top plan view of a container showing another embodiment of the container of the steam cooker.

FIG. 6 is a sketch of the top plan view of a container 140 of the steam cooker according to another embodiment of the invention. In the illustrated embodiment, the container 140 has two interacting barriers generally designated by reference numerals 141, 142. These two barriers 141, 142 together define a first or central compartment 144 and a second or peripheral compartment 146 which are in fluid communication with each other. Preferably, the shape and size of first or central compartment 144 generally corresponds to those of the heating element of the steam cooker, and the first or central compartment 144 is directly above the heating element, so that only the water in the first or central compartment 144 is directly heated by the heater.

The barrier 141 has an outer end 141a and an inner end 141b. The outer end 141a may be abutted against or disposed adjacent to the sidewall of the container 140. The barrier 141 may extend from the outer end 141a spiraling inwardly towards the inner end 141b. The inner portion 141c of the barrier 141 may extend substantially around half of the outer periphery of the heating element 32. The inner end 141b extends towards but not touching the inner surface of the barrier 142. The inner portion 141c of the barrier 141 and the outer portion 142d of the barrier 142 together define a narrowing horn-shaped passage 143 for bringing the water into the central compartment 144.

Similarly, the barrier 142 has an outer end 142a and an inner end 142b. The outer end 142a may be abutted against or adjacent to the sidewall of the container 140. The barrier 142 may extend from the outer end 142a spirally inwardly towards the inner end 142b. The inner portion 142c of the barrier 142 may extend substantially around the other half of the outer periphery of the heating element 32 such that the inner portions 141c, 142c together define the central compartment 144. The inner end 142b extends towards but not touching the inner surface of the barrier 141. The inner portion 142c of the barrier 142 and the outer portion 141d of the barrier 141 together define a narrowing horn-shaped passage 145 for bringing the water into the central compartment 144.

When water is poured into the container 140, the water fills up both the central and peripheral compartments 144, 146 of the container 140. The heating element 32 heats up the water in the central compartment 144 of the container 140 and steam so produced by such heating process rises up towards the steaming bowl 18.

As steam goes up from the central compartment 144 of the container 140, the water level within the central compartment 144 drops. As the water level within the central compartment 144 gradually drops, water from the peripheral compartment 146 gradually flows inwardly, as depicted by arrows V, through the passages 143, 145, and into the central compartment 146.

The two barriers 141, 142 of the present embodiment govern fluid communication between the central and peripheral compartments 144, 146 so that the water within the peripheral compartment 146 of the container 140 remains at a relatively lower temperature as compared to the temperature of the water within the central compartment 144. The heating method of the present invention does not necessarily heat up all the water within the container. Furthermore, the heating method avoids heating up of the water in the peripheral compartment 146 and in turn the sidewall of the base 12 which may waste energy and may burn the user.

Although the illustrated embodiment shows that two barriers 141, 142 govern the fluid communication between the central and peripheral compartments 144, 146, it is to be understood that three or more barriers can be used to define the central and peripheral compartments and to govern fluid communication between the central and peripheral compartments 144, 146.

Figure 7:
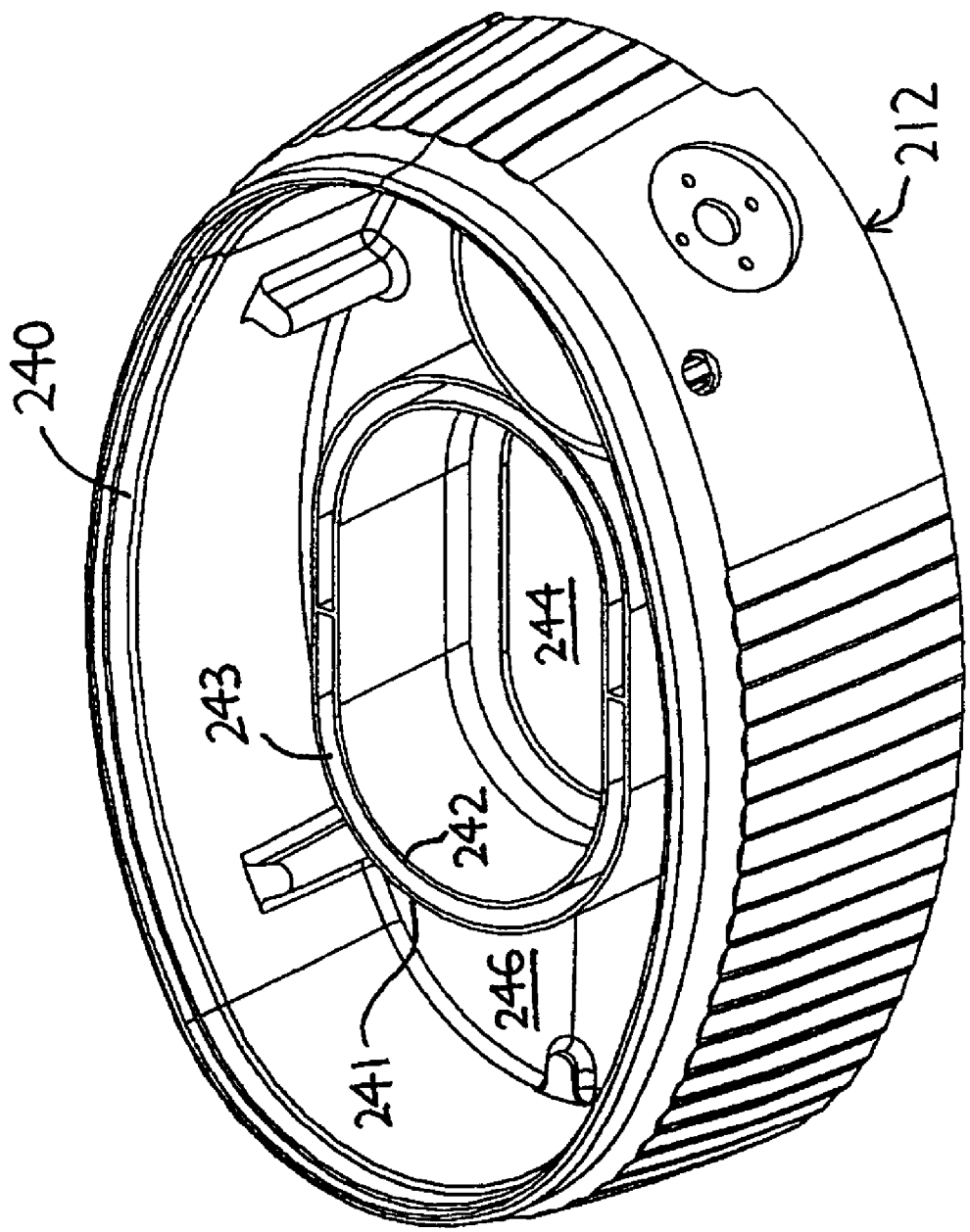
FIG. 7 is a perspective view of the base of the steam cooker showing a third embodiment of the container.

FIG. 7 is a perspective view of a base 212 of the steam cooker of the present invention showing another embodiment of the barrier. A container 240 is provided within the base 212.

As shown in FIGS. 7–9, the container 240 may include a loop-shaped outer barrier 241 and a loop-shaped inner barrier 242. The loop-shaped inner barrier 242 defines a first or central compartment 244 of the container 240, while the loop-shaped outer barrier 241 and the sidewall of the container 240 define a second or peripheral compartment 246 of the container 240. Preferably, the shape and size of first or central compartment 244 generally corresponds to those of the heating element of the steam cooker, and the first or central compartment 244 is directly above the heating element, so that only the water in the first or central compartment 244 is directly heated by the heater.

The loop-shaped outer and inner barriers 241, 242 define therein a loop-shaped channel or passage 243. A first opening 245, as best illustrated in FIG. 9, is provided along one side of the outer barrier 241. A second opening 247 is provided along one side of the inner barrier 242 opposite to the first opening 245. The first and second openings 245, 247 are preferably located at the bottom of the barriers 241, 242.

In the illustrated embodiment, the length and width of the central compartment 244 are about 123 mm and about 78 mm, respectively. The height and the thickness of the outer and inner barriers 241, 242 are about 40 mm and about 1.5 mm, respectively. The width of the passage 243 is about 4 mm, while each of the openings 245, 247 is about 4 mm×about 4 mm. It is understood that the invention is not limited to the above dimensions and that these dimensions may vary without departing from the scope of the present invention.

When water is poured into the container, the water fills up both the first or central compartment 244 and the second or peripheral compartment 246 of the container 240. The heating element heats up the water in the central compartment 244 of the container 240 and steam so produced by such heating process rises up from the central compartment 244 towards the steaming bowl 18.

As steam goes up from the central compartment 244 of the container 240, water level within the central compartment 244 drops. As the water level within the central compartment 244 gradually drops, water from the peripheral compartment 246 gradually enters the channel or passage 243 through the opening 245 and then enters into the central compartment 244 through the opening 247.

The loop-shaped outer and inner barriers 241, 242 as well as the openings 245, 247 control the movement of water within the container 240 and govern the fluid communication between the central and peripheral compartments 244, 246, so that the water within the peripheral compartment 246 of the container 240 remains at a relatively low temperature as compared to the temperature of the water within the central compartment 244. The heating method of the present invention does not necessarily to heat up all the water within the container 240. Furthermore, the heating method avoids heating up of the water in the peripheral compartment 246 and in turn the sidewall of the base 212 which may waste energy and may burn the user.

It is to be understood that the loop-shaped outer barrier 241 and inner barrier 242 can be any shape, including but not limited to round, oval, square or rectangular shaped. Further, although the illustrated embodiment shows that the outer barrier 241 and the inner barrier 242 have the first opening 245 and the second opening 247, respectively, it is to be understood that the barriers 241, 242 each may have more than one opening.

Figure 10:
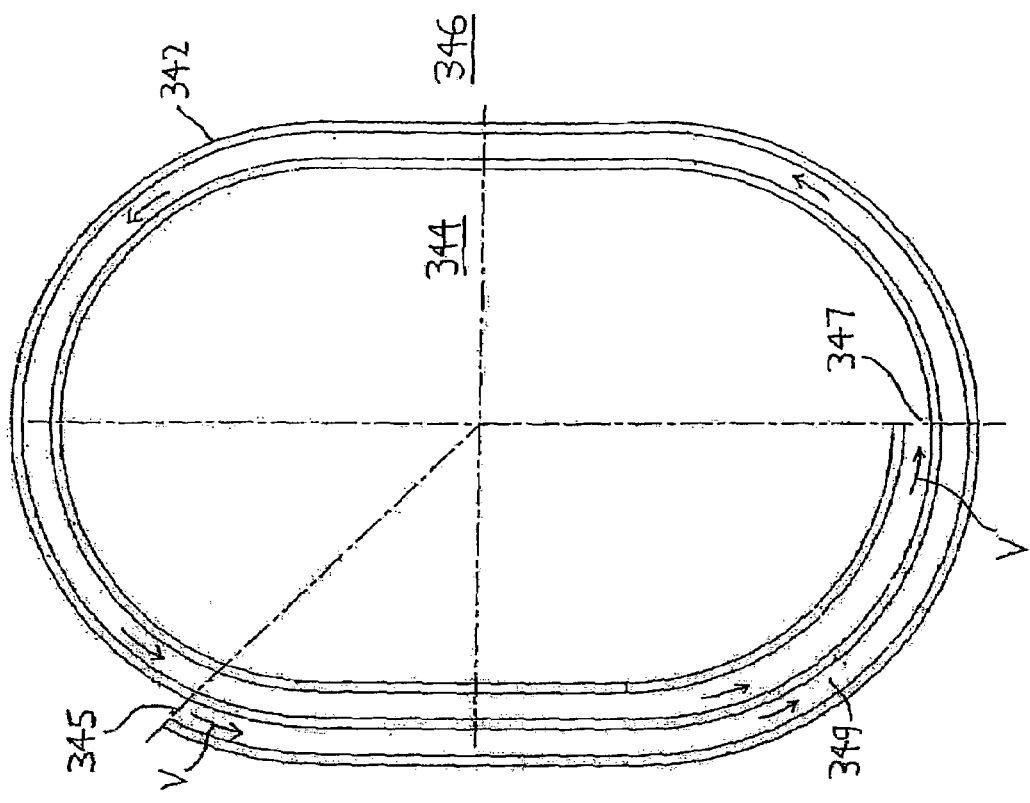
FIG. 10 is a top plan view of yet another embodiment of the barrier of the container.
Figure 11:
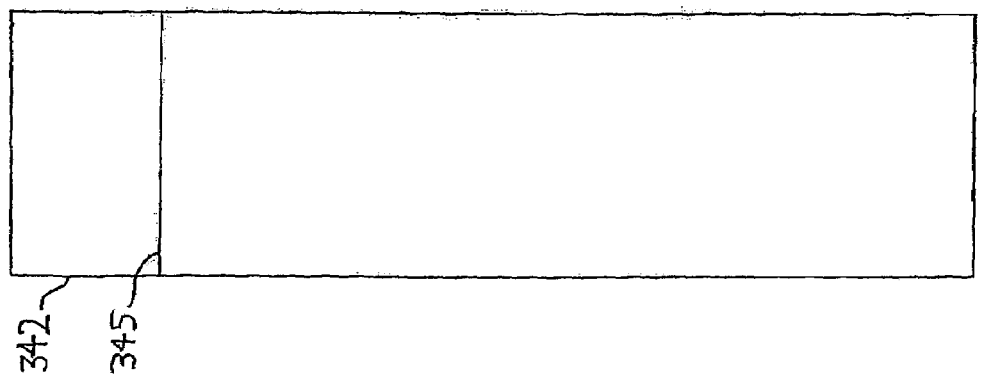
FIG. 11 is a side view of the barrier of FIG. 10.

FIGS. 10 and 11 are the top plan view and side view, respectively, of another embodiment of a barrier 342 of a container 340 of the present invention. The barrier 342 is in the form of a coil shape defining a coil-shaped passage 349. The barrier 342 has a water inlet 345 at an outer end of the coil and a water outlet 347 at an inner end of the coil.

The barrier 342 divides the container 340 into a first or central compartment 344 and a second or or peripheral compartment 346. Preferably, the shape and size of first or central compartment 344 generally corresponds to those of the heating element of the steam cooker, and the first or central compartment 344 is directly above the heating element, so that only the water in the first or central compartment 344 is directly heated by the heater.

In the illustrated embodiment, the height of the barrier 342 is about 40 mm, the width of the passage 349 is about 4 mm, and the width of the inlet and outlet is also about 4 mm. It is understood that the invention is not limited to the above dimensions and that these dimensions may vary.

When water is poured into the container, the water fills up both the first or central compartment 344 and the second or peripheral compartment 346. The heating element heats up the water in the central compartment 344 and steam so produced by such heating process goes up from the central compartment 344 towards the steaming bowl 18.

As steam goes up from the central compartment 344, water level within the central compartment 344 gradually drops and water in the peripheral compartment 346 gradually enters the water inlet 345, moves around the coil-shaped passage 349 as indicated by arrows V, discharges through the water outlet 347, and enters into the central compartment 344.

The coil-shaped barrier 342 controls the movement of water within the container and governs the fluid communication between the central and peripheral compartments 344, 346, so that the water within the peripheral compartment 346 remains at a relatively low temperature as compared to the temperature of the water within the central compartment 344. The heating method of the present invention does not necessarily heat up all the water within the container 340. Furthermore, the heating method avoids heating up of the water in the peripheral compartment 346 and in turn the sidewall of the base which may waste energy and may burn the user.

Figure 12:
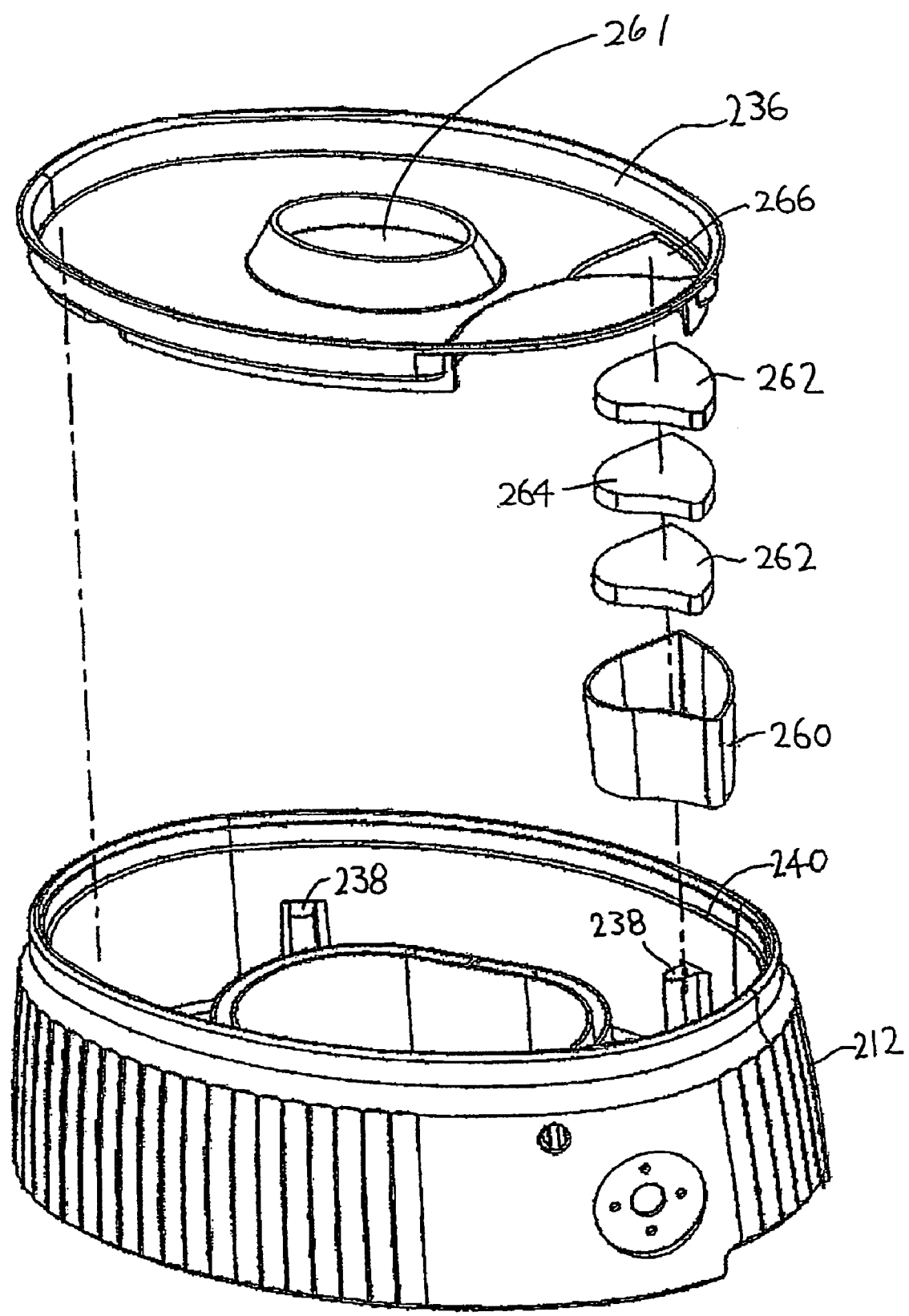
FIG. 12 is an exploded view of the base of the steam cooker showing a drip tray and a filtration assembly.

FIG. 12 shows the base 212 of the steam cooker of FIG. 7 together with a drip tray 236. The drip tray 236 can be adapted to be disposed on top of the container 240 and supported by the lugs 238. The drip tray 236 has an opening 267 corresponding to the first compartment of the container in shape and size for directing the steam moving upwardly towards the steaming bowl 18.

The collected drips can flow back to the second or peripheral compartment 246 of the container 240 through a hole 266 provided on the drip tray 236. Optionally, the drip tray 236 has a filter holder 260 and filters 262, 264. The filter holder 260 can be detachably mounted within the hole 266 provided on the drip tray 236. The filter holder 260 is adapted to hold a number of filters. In the illustrated embodiment, there are three filters, namely two fabric filters 262, and one charcoal filter 264 sandwiched between the two fabric filters 262. The fabric filters 262 are employed to filter substances dripped from the steaming bowl whereas the charcoal filter 264 is employed to absorb greasy substances in the water. The filtration assembly serves to recycle the water within the steam cooker 10 by collecting and directing the condensed water back to the container 18.

Figure 13:
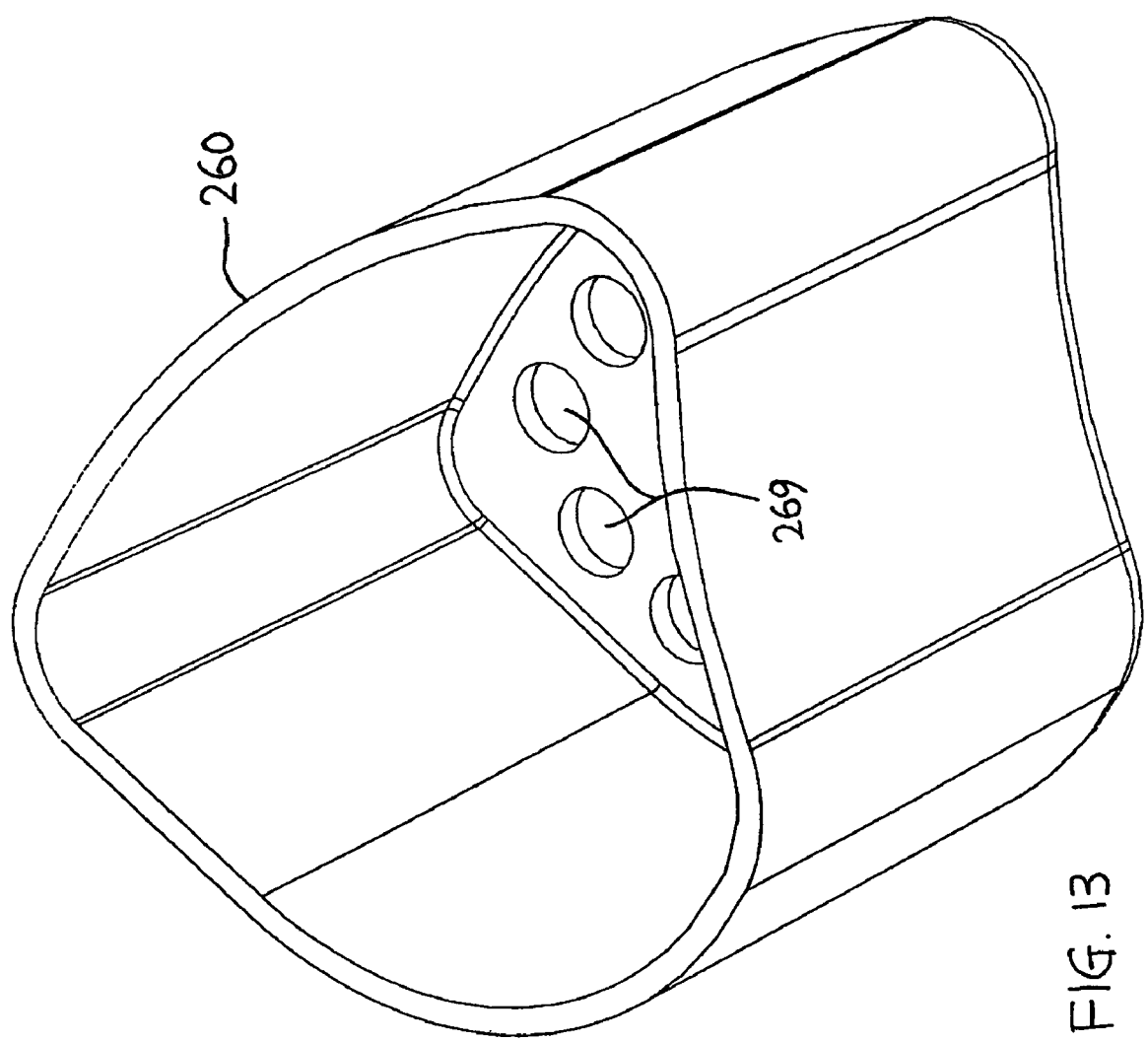
FIG. 13 is a perspective view of a filter holder of the filtration system of FIG. 12.

FIG. 13 is a perspective view of the filter holder 260 of FIG. 12. A number of holes 269 are provided on the bottom wall of the filter holder 260 allowing condensed and filtered water to pass therethrough and flow back to the container 240.

Figure 14:
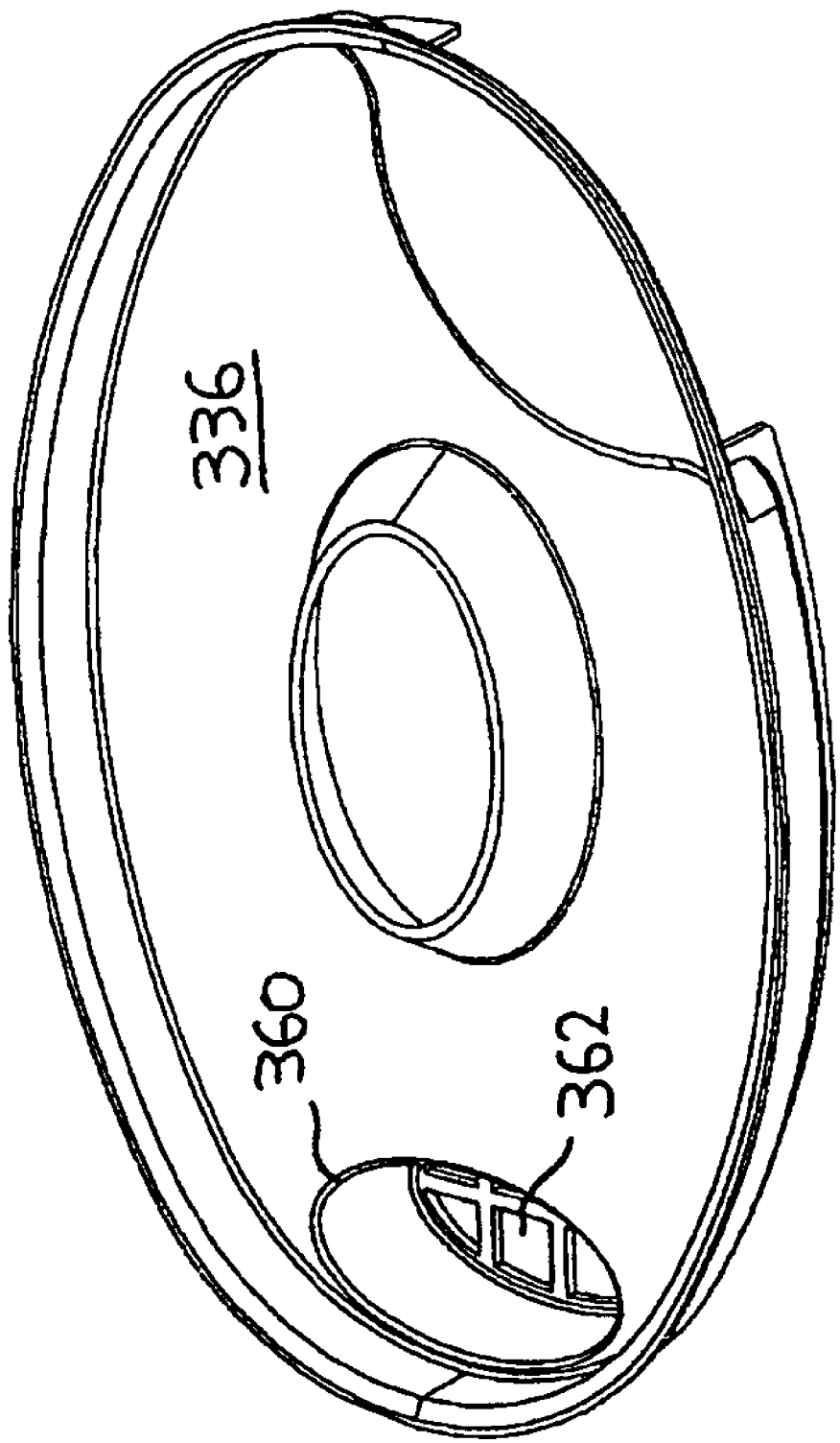
FIG. 14 is a top view of a drip tray.
Figure 15:
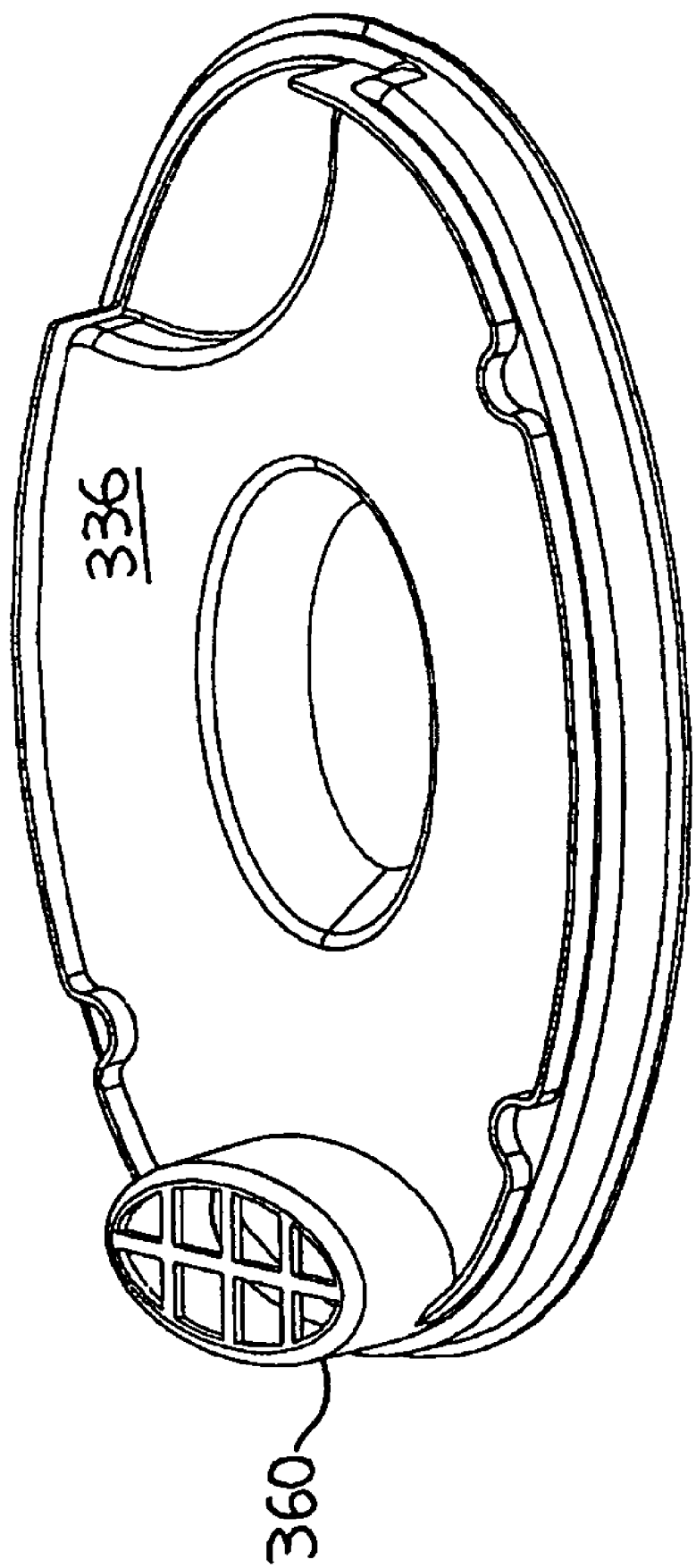
FIG. 15 is a bottom view of the drip tray of FIG. 14.

FIG. 14 shows another embodiment of a drip tray designated by reference numeral 336. The drip tray 336 is provided with a filter holder 360 for holding filters 362 therein. FIG. 15 shows the bottom view of the drip tray 336 of FIG. 14. The filter holder 360 is detachably mounted on the drip tray 336.

While the present invention has been shown and described with particular references to a number of preferred embodiments thereof, it should be noted that various other changes or modifications may be made without departing from the scope of the present invention.

What is claimed is:

1. A steam cooker comprising:
   a heating element;
   a container; and
   at least one barrier, the barrier being disposed in the container to divide the container into a first compartment adapted to receive water and a second compartment adapted to receive water, the heating element being disposed proximate to the first compartment while being disposed thermally remote to the second compartment, and the water in the first compartment and the water in the second compartment being in fluid communication with each other;
   wherein the at least one barrier extends spiraling inwardly from a sidewall of the container defining at least one water passage between the first and second compartments.

2. The steam cooker of claim 1, wherein the heating element is configured to be capable of heating the water in the first compartment to a boiling point while incapable of heating the water in the second compartment to a boiling point.

3. The steam cooker of claim 1, wherein the heating element is configured to consume electricity or gas.

4. The steam cooker of claim 1, wherein the barrier includes a wall extending upwardly from the bottom of the container.

5. The steam cooker of claim 1, wherein the barrier extends substantially around the heating element.

6. The steam cooker of claim 1, wherein the first compartment is generally at a center area of the container and the second compartment is generally at a peripheral area of the container.

7. The steam cooker of claim 1, further comprising a drip tray having an opening corresponding to the first compartment in shape and size for directing the steam upwardly.

8. A steam cooker comprising:
   a heating element;
   a container; and at least one barrier, the barrier being dispose in the container to divide the container into a first compartment adapted to receive water and a second compartment adapted to receive water, the heating element being disposed proximate to the first compartment while being disposed thermally remote to the second compartment, and the water in the first compartment and the water in the second compartment being in fluid communication with each other;

wherein the barrier is generally in a shape of "6" or "9" or a mirror image of number "6" or "9".

9. A steam cooker comprising:

a heating element;

a container; and at least one barrier, the barrier being disposed in the container to divide the container into a first compartment adapted to receive water and a second compartment adapted to receive water, the heating element being disposed proximate to the first compartment while being disposed thermally remote to the second compartment, and the water in the first compartment and the water in the second compartment being in fluid communication with each other;

wherein the barrier is generally in a shape of a coil which defines a coil-shaped water passage between the first and second compartments.

10. A steam cooker comprising:

a heating element;

a container; and at least one barrier including a loop-shaped inner barrier and a loop-shaped outer barrier, the baffler being disposed in the container to divide the container into a first compartment adapted to receive water and a second compartment adapted to receive water, the heating element being disposed proximate to the first compartment while being disposed thermally remote to the second compartment, and the water in the first compartment and the water in the second compartment being in fluid communication with each other;

wherein the loop-shaped inner barrier defines the first compartment;

the loop-shaped outer barrier and a sidewall of the container define the second compartment;

the loop-shaped inner barrier and loop-shaped outer barrier define therein a loop-shaped water passage;

the loop-shaped inner barrier includes a first opening; and the loop-shaped outer barrier includes a second opening.

11. The steam cooker of claim 10, wherein the first opening is generally opposite to the second opening.

12. A method of steam cooking, the method comprising the steps of:

providing a cooking apparatus including a heating element, a container, and at least one barrier, the barrier being disposed in the container to divide the container into a first compartment adapted to receive water and a second compartment adapted to receive water, the heating element being disposed proximate to the first compartment while being disposed thermally remote to the second compartment, wherein the at least one barrier extends spiraling inwardly from a sidewall of the container heating water in the first compartment; and permitting water in the first compartment to be in fluid communication with water in the second compartment through a water passage defined by the at least one barrier.

* * * * *

UNITED STATES PATENT AND TRADEMARK OFFICE
CERTIFICATE OF CORRECTION

PATENT NO. : 7,208,702 B2
APPLICATION NO. : 11/126748
DATED : April 24, 2007
INVENTOR(S) : Lung Wai Choi It is certified that error appears in the above-identified patent and that said Letters Patent is hereby corrected as shown below:

Column 9
Line 1, delete "dispose" and replace it with --disposed--
Line 31, delete "baffler" and replace it with --barrier--

Column 10
Line 27, add a semi-colon after the word "container"

Signed and Sealed this

Twelfth Day of June, 2007

JON W. DUDAS
*Director of the United States Patent and Trademark Office*